April 14, 1931.  O. B. MUELLER ET AL  1,801,171

PIPE FITTING AND THE PROCESS OF MAKING THE SAME

Filed Dec. 12, 1929

Oscar B. Mueller,
Ward M. Robinson,
Harold K. Rader,
Inventors
Delor G. Haynes
Attorney Patented Apr. 14, 1931

1,801,171

UNITED STATES PATENT OFFICE

OSCAR B. MUELLER, OF ST. CLAIR COUNTY, AND WARD M. ROBINSON AND HAROLD K. RADER, OF PORT HURON, MICHIGAN, ASSIGNORS TO MUELLER BRASS CO., OF PORT HURON, MICHIGAN, A CORPORATION OF MICHIGAN

PIPE FITTING AND THE PROCESS OF MAKING THE SAME

Application filed December 12, 1929. Serial No. 413,460.

This invention relates to means for coupling pipes, and the application thereof to pipe fittings, and with regard to certain more specific features, to coupling means wherein is used a soldering principle.

Among the several objects of the invention may be noted:

The provision of a coupling means of the class described which is especially adapted for use with thin-walled, preferably copper, brass or the like pipe;

The provision of coupling means of the class described which is universally applicable to all types of pipe fittings;

The provision of coupling means of the class described which is applicable to both cast, forged or stamped fittings and fittings made from formed tubing;

The provision of coupling means which, when applied to a fitting, are complete in and with said fitting to effect a coupling without the use of extraneous sealing materials;

The provision of coupling means which, when applied to a fitting, necessitate no special operation upon a pipe end to engage said fitting;

The provision of coupling means which, in use, effect a secure and durable joining, yet which permits of disjoining with a minimum of effort and trouble;

The provision of coupling means which may be applied with a minimum of effort and trouble, and which is economically manufactured with a minimum of machining operations; and, The provision of a pipe fitting embodying the coupling of the class described which is fool-proof in that said fitting includes means to prevent a pipe from being inserted too far thereinto, and which includes means for automatically, axially aligning said fitting and a pipe applied thereto.

Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claim.

In the accompanying drawings, in which are illustrated several of various possible embodiments of the invention, Fig. 1 is a perspective view showing the invention in its application to a tube type of pipe fitting;

Corresponding reference characters indicate corresponding parts throughout the several views of the drawings.

Figure 1:
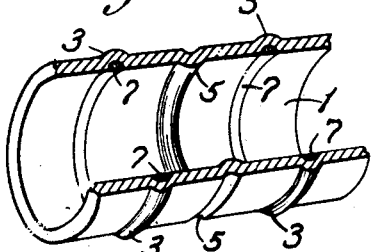

The coupling means per se, as illustrated in the drawings, comprises a pre-laid band or ring of solder, located preferably in the female portion or socket of a pipe fitting. This solder may assume several forms, as shown in the various figures, but generically it comprises a surface substantially annular in character upon the interior of a fitting. The solder is applied to the fitting prior to the use thereof by any of several methods, which include the pressing of a pre-formed ring into position, the leading of a strip of solder into position so that it is formed as an annular band, the casting of molten solder into the desired annular form, and other methods of a similar nature.

The pipe fitting is thereby presented for use with a pre-formed band of sealing material therein. In operation or use, the male end of a pipe is inserted into the female coupling, the band of solder thereby surrounding the pipe end, and heat is externally applied (as, for example, by a blow torch) to fuse the solder and thereby weld the joint tightly and effectively.

It is to be noted that the term solder as used herein includes generically all such sealing materials that are adapted to fuse under heated conditions and effect a sealing weld between the fitting and the pipe. Such materials include ordinary plumber's solder, lead, spelter, brazing material, fusible metal, and others of like character.

It is not necessary that the surface of the fitting to receive the solder be machined or otherwise dressed. Such a surface may in fact comprise a rough cast surface, a partially machined surface, or a completely machined surface, and in general it may be said that the operativeness of the invention herein described is independent of the contour of the surface with which it is used.

The advantages of the coupling herein described are many. In the first place, it eliminates costly threading and tapping operations for the fixture and pipe end, which threading operations have the further disadvantage of substantially weakening the walls of thin-walled copper and brass pipe and the like, and similar fittings. Because of the soft nature of the copper and brass, it has been found that threaded couplings between piping made of such materials is somewhat unreliable to effect a proper sealed joint, especially when under stressed conditions. Over prior types of soldered joints, this type of coupling has the distinct advantage that the solder is already in position in the unused coupling, and no inconvenient pot of molted solder, or difficult wiping operation is necessary. Further, in such prior couplings, it has been disadvantageous and practically impossible to obtain a secure coupling when the fitting is, for example, in a vertical position opening downwardly, or when the fitting is in a relatively inaccessible position. The coupling means of the invention herein may be manipulated with simplicity and ease, regardless of the relative positioning or inaccessibility of the fitting.

The coupling means will next be described in relation to its application to various types of fittings.

Figs. 1 to 6 illustrate the invention as applied to tubular types of fittings. In this application of the invention the fitting per se comprises a relatively thin-walled tube of brass, copper or the like.

Fig. 1 is a perspective view, partly in section, and shows a fitting 1, which is thin-walled as described above, which has rolled or otherwise impressed therein two inwardly concave annular grooves 3, and a centrally located bead or outwardly concave annular groove 5. Mounted in the grooves 3, on the inside of the fitting 1, is a ring of solder 7. By reference to Fig. 2 it will be seen that the solder 7 substantially fills the grooves 3. The bead 5 serves to prevent the insertion of one pipe end too far into the fitting, and also assists in axially aligning a pipe end in the fitting. After telescoping a pipe into the fitting, and suitable exterior application of heat, it will be seen that the solder 7 will fuse and weld together the pipe and the fitting 1 around the entire junction thereof, thereby insuring a complete and sealed joint.

It is desirable that the members to be joined be cleaned and/or fluxed before the described soldering operation is effected. This statement holds true for the forms set out hereinafter.

While Fig. 1 and certain of the other figures herein illustrate the invention as applied to a nipple, it is to be understood that the invention operates equally successfully with any other type of fitting, such as, for example, L's, T's, crosses, reducers, and combinations of the same, and the like.

Figure 2:
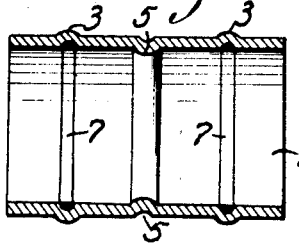
Fig. 2 is an axial section of the fitting of Fig. 1.
Figure 3:
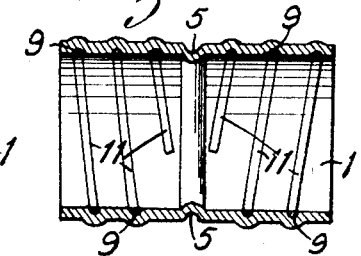
Figs. 3, 4, 5 and 6 are axial sections similar to Fig. 2 illustrating the Fig. 1 embodiment of the invention in several modifications.

In Fig. 3 is illustrated a modification of the Fig. 1 and Fig. 2 type of fixture, wherein is shown the fitting 1, having a helical inwardly concave groove 9 on each end of said fitting. The helical grooves 9 are filled with a helical strip of solder 11. This modification of the invention is especially suitable where the finished coupling is put under a twisting strain. The coupling operation is substantially the same as that described under the Fig. 1 embodiment.

Figure 4:
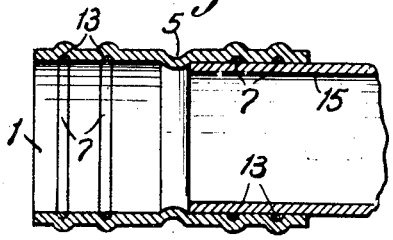

In Fig. 4 is illustrated a modification of the Fig. 1—Fig. 2 type of fixture, wherein is shown the usual fitting 1, having, instead of the single grooves 3, a pair of double grooves 13 filled with solder 7. Inasmuch as this embodiment includes more solder than the others, it is particularly adapted to use where an unusually tight joint is required, or where the completed coupling is to be put under longitudinal or axial stress. At the right of Fig. 4 is shown a pipe end 15 in position in the fitting 1 for the sealing operation.

Figure 5:
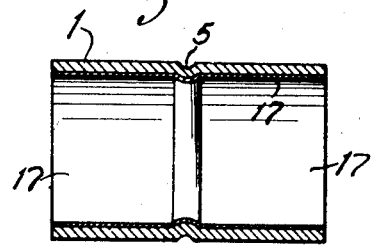

Fig. 5 shows a modification of the Fig. 1 and Fig. 2 embodiment, wherein no grooves such as the grooves 3 in Fig. 1 are presented, and instead, the entire interior of the fitting 1, or at least the interior ends thereof, is overlaid by an annular sheet of solder 17. The sheet or band 17 may be made considerably thinner than the ring 7, inasmuch as in this embodiment it is not necessary that the solder spread to effect a complete joint and seal. This embodiment is more easily manufactured than the foregoing embodiments. It is coupled to a pipe end in the manner described hereinbefore.

Figure 6:
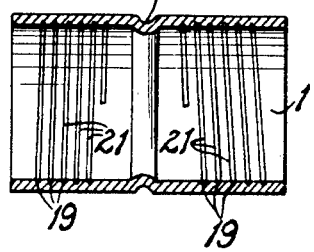

In Fig. 6 is shown a modification wherein the fitting 1 is provided at each end with a fine threaded groove 19, which is filled with sheet or rod or compressed, finely divided or powdered solder 21.

It is to be understood that the grooves such as 3 in Fig. 1 may be rolled, pressed, burnished, cut, or otherwise manufactured in the interior of the fitting 1. It is also to be understood that the solder or amalgamating material such as 7 in Fig. 1 may be rolled, burnished, drawn or otherwise machined into proper position in the interior of the fitting 1. In principle, the solder or amalgamating material is most desirably placed in such position so that upon heating as described, the solder will fuse and weld or amalgamate the female fitting and the male pipe end.

It is more advantageous to form pipe fittings which are curved, such as L's, T's, crosses, reducers and the like by casting them than by drawing the thin-walled tubing fittings described hereinbefore. The present invention can be applied equally well to such cast fitting, as will be pointed out hereinafter.

Figure 7:
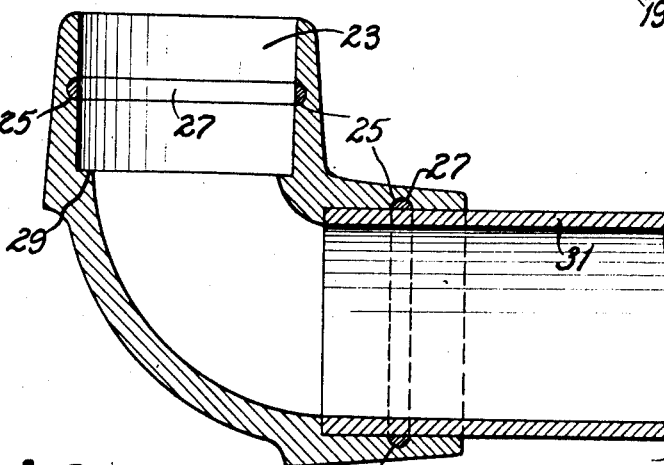
Fig. 7 is an axial section of the invention in its application to a cast elbow fitting.

In Fig. 7 is illustrated an L, which has been cast to have a female receiving portion 23 at each end thereof. The female portions 23 may be cast, machined by boring, or the like. An interior annular groove 25 is provided in each female portion 23, similar to the groove 3 in the Fig. 1 embodiment, and the grooves 25 are filled with solder 27. An annular shoulder 29 is formed at the interior end of each of the female portions 23, said shoulder 29 serving a similar purpose to that of the groove 5 in the Fig. 1 embodiment, namely, to limit the degree to which a male pipe end may be inserted and to suitably, axially align said pipe end. The shoulder 29 thereby functions as a restricting projection. Other types of restricting projections, as, for example, a projecting spot, may be suitably substituted for the shoulder 29. This embodiment of the invention is utilized by suitably positioning a pipe end 31 in the female portion 23, and then externally applying heat to melt the solder to join the pipe end and the fixture together to effect a sealed joint.

Figure 8:
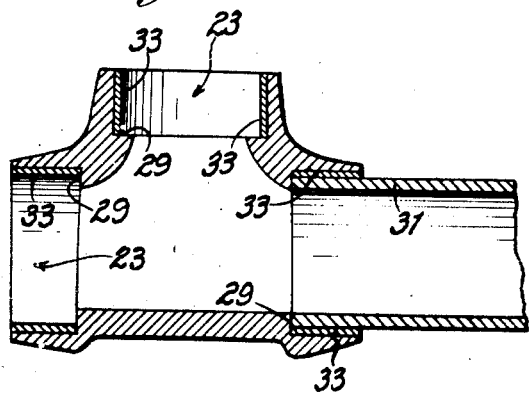
Fig. 8 is an axial section of a modification of the Fig. 7 type of coupling in its application to a cast T fitting; and, Fig. 9 is an axial section of a second modification of the Fig. 7 type of coupling in its application to a reducer fitting.

In Fig. 8 is illustrated a cast T, in which the female portions 23 are overlaid with a covering of solder 33, and no groove is provided. In this embodiment of the invention the solder layer 33 may be made quite thin, inasmuch as no spreading is necessary in order to secure a complete sealing. The pipe end 31 is shown in fused or sealed position.

Figure 9:
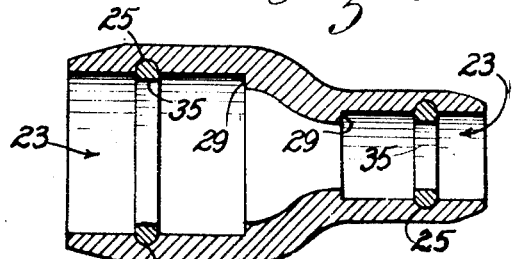

In Fig. 9 is illustrated a modification of the Fig. 7 type of fixture (applied to a reducer) in which the solder ring 27, flush with the sides of the female portion 23 in Fig. 7, is replaced by a solder ring 35 which extends into the said female portion 23. This embodiment is utilized in a slightly different manner than the foregoing embodiments, in that the fixture is preferably heated to soften the solder 35 before the pipe end 31 is inserted. When said pipe end 31 is inserted, it wipes the extending portion of the solder ring 35 forwardly, and tends to push the softened solder into a sealing position between said pipe end 31 and said female portion 23. Thus more solder is provided for the joining, and a more complete sealing is effected, while but one groove 25 is required.

An important advantage of the described form of sealing material (a ring, at least in end elevation) extending into the socket as illustrated in Fig. 9 is found in the manner in which such material, either when cold or when softened by heating, exerts an effect to tend to position the entering member a proper capillary distance from the walls of the socket portion. The entering member is not necessarily accurately centered in the socket, but the protruding excess of material provides means whereby a substantial portion of the surface of the entering member is held in spaced relationship, or out of contact, with the walls of the socket. Such positioning facilitates the subsequent sealing operation and provides for a more uniform and secure joint.

It is to be understood that others of the Fig. 1 to Fig. 6 embodiments may be adapted to the cast type of fitting, the Fig. 7, 8 and 9 forms being only by way of example. Similarly, the Fig. 9 modification, wherein the solder extends into the fixture, and is not flush therewith, may be adapted to the tubing type of coupling.

In preparing the cast type of fitting, it is to be noted that the solder, or amalgamating material, may be cast or flowed into place in the fitting in either a rough cast surface or a finished surface or a finished and roughened or pocketed surface. It may then be brought to size by coining, casting, broaching, reaming, punching or any of a variety of ways well known in the art. This is likewise true of the tubing type of fitting.

It will be seen that in the cast type of fitting, it is possible to so make the shoulders 29 that the interior surface of the pipe end forms a continuation of the interior surface of the fitting, thereby eliminating the customary swirl spaces which occasion unnecessary friction and the noises.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

A fitting having a socket adapted to receive an entering member, said socket having at least one groove formed therein and extending therearound, a ring of sealing material in said groove having a portion thereof extending into said socket beyond the walls of the groove, said extending portion being in width less than the axial length of said socket, to provide means for maintaining said entering member in substantially spaced relationship with the walls of said socket, the fitting and said member being separated by a space of the order of magnitude for capillary flowing of sealing material therethrough, said sealing material when melted flowing throughout said space and, when cooled, sealing said fitting and member together.

In testimony whereof, we have signed our names to this specification.

OSCAR B. MUELLER.
WARD M. ROBINSON.
HAROLD K. RADER.